ically, the invention relates to an apparatus which
United States Patent Office 3,073,248
Patented Jan. 15, 1963

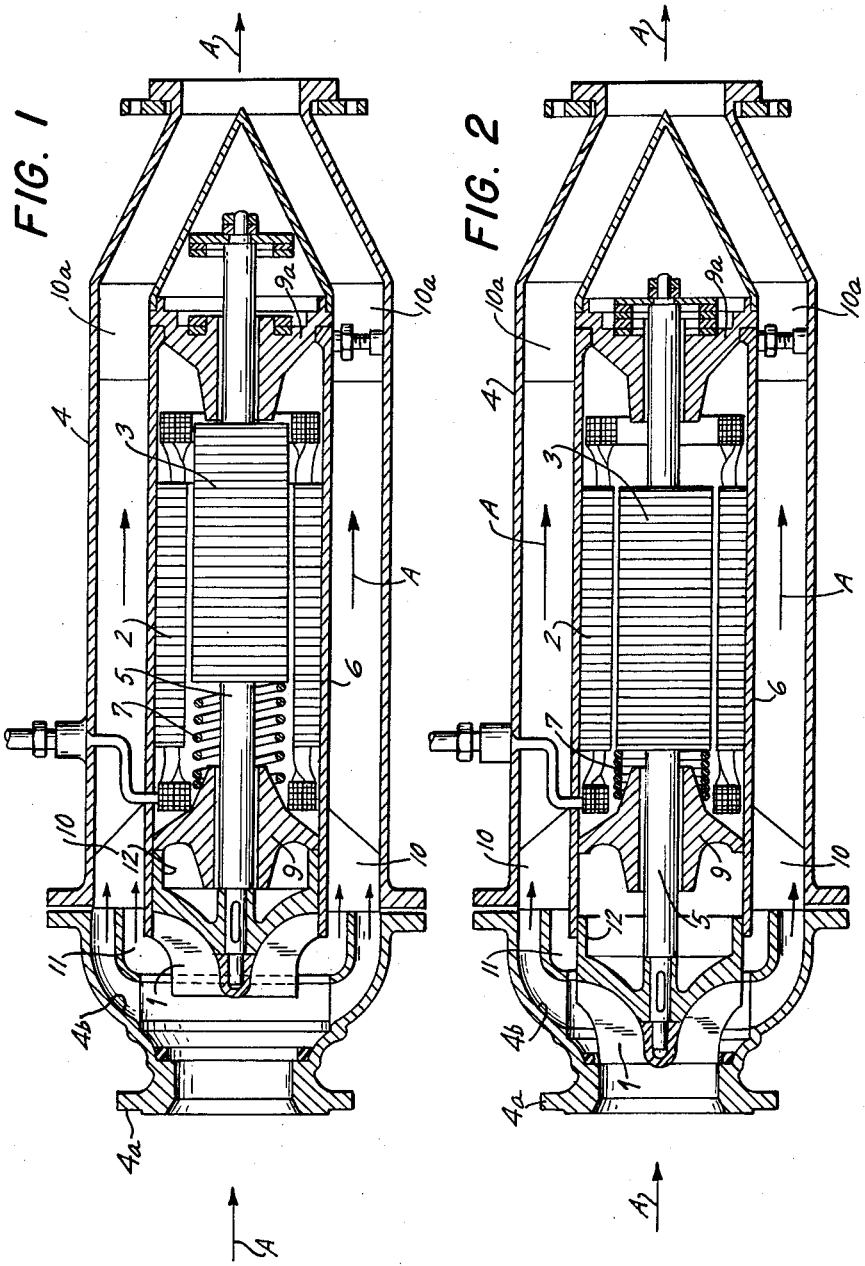

3,073,248
FLUID MOVING APPARATUS
Henning G. Bartels, Luejenburgerstr 26,
Ploen, Holstein, Germany
Filed Jan. 12, 1961, Ser. No. 82,198
5 Claims. (Cl. 103—87)

The present invention relates to fluid moving apparatus in general, and more particularly to an apparatus for intermittently increasing the pressure or the speed of a fluid continuously flowing through a pipeline. Still more particularly, the invention relates to an apparatus which constitutes an improvement over the device disclosed in my U.S. Patent No. 2,824,520 granted on February 25, 1958.

An important object of the invention is to provide a fluid moving apparatus comprising a centrifugal pump and drive means for the same which is constructed and assembled in such a way that the advantageous flow characteristics of the conveyed fluid when the pump is idle remain unchanged under all operating conditions, i.e. even if the fluid is conveyed at a greatly increased pressure or if the quantity of fluid conveyed through the pipeline per unit of time is reduced well below the normal value.

Another object of the invention is to provide a fluid moving apparatus of the just outlined characteristics which is of very simple construction, which comprises a small member of component parts, which may be readily installed in a pipeline, and whose operation is fully automatic so that it requires no further attention once it is put to actual use.

With the above objects in view, the invention resides in the provision of a fluid moving apparatus for increasing the pressure and/or the speed of a fluid flowing through a pipeline which comprises a centrifugal pump having a casing adapted to be built into the pipeline, a bladed impeller located in the casing, supporting means comprising a shaft connected with the impeller for rotary movement about an axis and for axial movement between an operating position in which the impeller is adjacent to the inner surface of the casing to offer substantial resistance to the flow of fluid and a rest position in which the impeller is more distant from the inner surface of the casing to offer less resistance to the flow of fluid, drive means preferably assuming the form of an electric motor which is operatively connected with the aforementioned shaft and which is adapted to rotate and to move the impeller to its operative position, means for shifting the impeller to the position of rest when the drive means is inactive, means defining at least one additional or auxiliary passage for the fluid, and valve means connected to and movable with the impeller to a first position for sealing the additional passage when the impeller is in operating position, and to a second position for exposing the additional passage when the impeller assumes its position of rest. The valve means may be a cylindrical slide or sleeve valve.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 1 is a longitudinal central section through the apparatus of my invention showing the impeller in rest position; and FIG. 2 is a similar section showing the impeller in operating position.

Referring now in greater detail to the drawings, there is shown an apparatus for increasing the pressure and/or speed of a fluid continuously flowing through a pipeline which comprises a centrifugal pump having a casing 4 adapted to be built into a pipeline (not shown) in which the apparatus is to be used and through which the fluid flows in the direction indicated by the arrows A. A bladed impeller 1 is located in the casing 4 adjacent to the latter's intake 4a. The impeller is movable in the axial direction of and with the supporting shaft 5 between the positions of FIGS. 1 and 2 in which the impeller is respectively spaced from and adjacent to the inner surface 4b of the casing 4. The impeller 1 and the casing 4 define a fluid passage whose cross-sectional area is enlarged when the impeller is in the rest position of FIG. 1, and whose cross-sectional area is reduced when the impeller is axially moved to the operating position of FIG. 2. The supporting shaft 5 connects the impeller 1 with the rotor 3 of a drive means in the form of an electric motor whose stator 2 is fixedly mounted in a cylindrical housing 6 provided in the interior of the casing 4. The impeller 1, the shaft 5 and the rotor 3 are supported for rotation in spaced bearings 9, 9a respectively located at the forward and rear ends of the housing 6.

When the impeller 1 is axially moved with the shaft 5 to the position of FIG. 2, it is closely adjacent to the inner surface 4b and offers substantial resistance to the flow of a fluid, e.g. water. When the impeller is axially moved to the position of FIG. 1 in which it is more distant from the inner surface 4b, it will offer less resistance to the flow of fluid through the passage within the casing 4.

In the position of FIG. 2, the rotor 3 is fully received within the stator 2. However, when the impeller 1 is moved to its rest position, the rotor 3 is axially displaced with respect to and projects rearwardly from the stator.

The apparatus further comprises means, here shown as a helical resilient element 7, for permanently biasing the impeller 1 to the position of rest which is shown in FIG. 1. The resilient element 7 operates between the front bearing 9 and the rotor 3 and is thus adapted to automatically shift the impeller 1, the shaft 5 and the rotor 3 to the position of FIG. 1 excepting when its axial force in the direction of the arrows A is overcome in a manner as will be fully explained hereinafter. The housing 6 is spaced from the casing 4 by distancing elements in the form of front and rear radial ribs 10, 10a, respectively, so that the fluid may flow through the annular channel between the parts 4 and 6.

The operation of the apparatus will be readily understood. When the casing 4 is built into a pipeline which conveys a continuous fluid stream and the impeller 1 is in the position of rest as shown in FIG. 1, the rotor 3 projects to a certain extent from the stator 2 under the bias of the resilient element 7. Since the rotor 3 is connected to the shaft 5, the latter brings about automatic axial displacement of the impeller 1 to the position of rest in which the impeller is spaced from the inner surface 4b and offers little resistance to the flow of fluid in the direction of the arrows A. When the motor current is switched on and the stator 2 is energized, the electromagnetic force created between the stator 2 and the rotor 3 will retract the rotor into the stator against the bias of the resilient element 7 in the same manner as the armature of an electromagnet is pulled into the coil of the electromagnet when the coil is energized. When the rotor 3 assumes the position of FIG. 2, the impeller 1 is shifted to its operating position in which its blades are closely adjacent to the inner surface 4b and provide an efficient pumping action when the impeller is rotated by the rotor 3. Such rotation of the impeller increases the speed and/or the pressure of the fluid flowing through the pipeline. When the motor current is switched off, the stator 2 is deenergized and the resilient element 7 is free to shift the shaft 5, the rotor 3 and the impeller 1 to the position of FIG. 1. It will be readily understood that the resilient element 7 is an optional feature of the fluid moving apparatus since the fluid impinging against the cover 8 will automatically shift the impeller to the position of FIG. 1 as soon as the stator 2 is deenergized.

In accordance with my invention, the apparatus comprises at least one additional passage 11, and the impeller 1 is connected with a valve means 12 in such a way that this valve means participates in axial movements of the impeller. When the impeller 1 is in the rest position of FIG. 1, the valve means 12 exposes the additional passage 11 for the flow of fluid. However, when the stator 2 is energized and the impeller 1 assumes the operating position of FIG. 2, the valve means 12, preferably a slide valve, also assumes its operating position in which it seals the additional passage to the flow of fluid. In other words, the cross-sectional area available for the flow of a fluid is greater when the impeller is at a standstill (FIG. 1) than if the impeller is rotated to increase the speed and/or the pressure of the conveyed fluid.

The provision of the valve means 12 and of the additional passage 11 insures that the advantageous flow characteristics of the conveyed fluid remain unchanged or nearly unchanged even if the operating conditions should vary for a number of reasons. For example, the improved apparatus will insure satisfactory flow characteristics in the event that the fluid must be conveyed at very high pressures or when the quantity of fluid is reduced so that the cross-sectional area at the discharge end of the impeller is reduced with attendant increase in the speed of the fluid.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalency of the following claims.

What is claimed as new and desired to be secured by Letters Patent is:

1. A fluid moving apparatus for increasing the pressure and/or the speed of a fluid flowing through a pipeline, said apparatus comprising, in combination, a casing adapted to be built into the pipeline, said casing having an inlet and an outlet; a bladed impeller located in said casing intermediate said inlet and said outlet; means supporting said impeller for rotary movement about an axis and for axial movement between an operating position in which the impeller is moved toward said inlet to offer substantial resistance to the flow of fluid, and a rest position in which the impeller is more distant from said inlet than in said operating position to offer less resistance to the flow of fluid; drive means operatively connected with said impeller for rotating and for automatically moving the same to said operating position; means for automatically shifting the impeller to said rest position when the impeller is not rotated by said drive means; means provided in said casing adjacent to and in communication with said inlet and defining with said impeller at least on auxiliary passage for the fluid; and valve means connected to and movable with said impeller to a first position for sealing said passage when the impeller is in said operating position, said valve means movable by said shifting means to a second position for exposing said passage when the impeller is in said rest position whereby the flow of fluid between said inlet and said outlet is less restricted when the impeller is moved to said rest position.

2. A fluid moving apparatus for increasing the pressure and/or the speed of a fluid flowing through a pipeline, said apparatus comprising, in combination, a casing adapted to be built into the pipeline, said casing having an inlet and an outlet; a bladed impeller located in said casing; means supporting said impeller for rotary movement about an axis and for axial movement between an operating position in which the impeller is moved toward said inlet to offer substantial resistance to the flow of fluid, and a rest position in which the impeller is more distant from said inlet than in said operating position to offer less resistance to the flow of fluid; drive means operatively connected with said impeller for rotating and for automatically moving the same to said operating position; means for automatically shifting the impeller to said rest position when the impeller is not rotated by said drive means; means provided in said casing adjacent to and in communication with said inlet and defining with said impeller at least one auxiliary passage for the fluid; and slide valve means connected to and movable with said impeller to a first position for sealing said passage when the impeller is in said operating position, said valve means movable by said shifting means to a second position for exposing said passage when the impeller is in said rest position whereby the flow of fluid between said inlet and said outlet is less restricted when the impeller is moved to said rest position.

3. A fluid moving apparatus for increasing the pressure and/or the speed of a fluid flowing through a pipeline, said apparatus comprising, in combination, a casing adapted to be built into the pipeline, said casing having an inlet and an outlet; a bladed impeller located in said casing; means supporting said impeller for rotary movement about an axis and for axial movement between an operating position in which the impeller is moved toward said inlet to offer substantial resistance to the flow of fluid, and a rest position in which the impeller is more distant from said inlet than in said operating position to offer less resistance to the flow of fluid; electric motor means operatively connected with said impeller for rotating and for automatically moving the same to said operating position; resilient means for automatically shifting the impeller to said rest position when the impeller is not rotated by said motor means; means provided in said casing adjacent to and in communication with said inlet and defining with said impeller at least one auxiliary passage for the fluid; and valve means connected to and movable with said impeller to a first position for sealing said passage when the impeller is in said operating position, said valve means movable by said resilient means to a second position for exposing said passage when the impeller is in said rest position whereby the flow of fluid between said inlet and said outlet is less restricted when the impeller is moved to said rest position.

4. An apparatus for increasing the pressure of fluids in a pipeline comprising, in combination, a centrifugal pump including a casing having an inlet and an outlet, an impeller mounted within the casing and defining with the latter a passage for the fluid, shaft means coaxially connected with and adapted to rotate and to axially displace said impeller between an operating position in which the impeller is moved toward said inlet and reduces the cross-secitonal area of said passage and a rest position in which the impeller is more distant from said inlet and increases the cross-sectional area of said passage; motor means connected with said shaft for rotating and for axially moving the impeller to said operating position; means provided in said casing adjacent to and in communication with said inlet and defining with said impeller at least one additional passage for the fluid; and valve means connected with said impeller for sealing said additional passage when the impeller is in said operating position whereby the flow of fluid between said inlet and said outlet is less restricted when the impeller is moved to said rest position.

5. An apparatus for increasing the pressure of fluids in a pipeline comprising, in combination, a centrifugal pump including a casing having an inlet and an outlet, an impeller mounted within the casing and defining with the latter a passage for the fluid, shaft means coaxially connected with and adapted to rotate and to axially displace said impeller between an operating position in which the impeller is moved toward said inlet and reduces the cross-sectional area of said passage and a rest position in which the impeller is more distant from said inlet and increases the cross-sectional area of said passage; means for permanently biasing the impeller to said rest position; motor means connected with said shaft for rotating and for axially moving the impeller to said operating position against the force of said biasing means; means provided in said casing adjacent to and in communication with said inlet and defining with said impeller at least one additional passage for the fluid; and valve means connected with said impeller for sealing said additional passage when the impeller is in said operating position, said basing means permanently urging said valve means to a position in which said additional passage is exposed whereby the flow of fluid between said inlet and said outlet is less restricted when the impeller is moved to said rest position.

References Cited in the file of this patent

UNITED STATES PATENTS

| | | |
|---|---|---|
| 2,824,520 | Bartels | Feb. 25, 1958 |
| 2,978,150 | Doelcher | Apr. 4, 1961 |